United States Patent
Capron et al.

(10) Patent No.: US 8,173,100 B2
(45) Date of Patent: May 8, 2012

(54) CATALYTIC SYSTEM FOR GENERATING HYDROGEN BY THE HYDROLYSIS REACTION OF METAL BOROHYDRIDES

(75) Inventors: Philippe Capron, Le Pin (FR); Jérôme Delmas, Merignac (FR); Nathalie Giacometti, Claix (FR); Isabelle Rougeaux, Rives (FR)

(73) Assignee: Commisariat a l'Energie Atomique (FR)

(*) Notice: Subject to any disclaimer, the term of this patent is extended or adjusted under 35 U.S.C. 154(b) by 57 days.

(21) Appl. No.: 12/603,916

(22) Filed: Oct. 22, 2009

(65) Prior Publication Data

US 2010/0178240 A1    Jul. 15, 2010

(30) Foreign Application Priority Data

Oct. 24, 2008 (FR) ..................... 08 05914

(51) Int. Cl.
C01B 3/08 (2006.01)
C01B 3/02 (2006.01)
B01J 8/02 (2006.01)
B01J 35/02 (2006.01)
B01J 23/00 (2006.01)
B01J 21/00 (2006.01)
B01J 20/00 (2006.01)
B01J 29/00 (2006.01)
H01M 8/06 (2006.01)

(52) U.S. Cl. ...................... 423/657; 423/648.1; 429/421; 422/211; 502/243; 502/256; 502/257; 502/258; 502/259; 502/260; 502/261; 502/262; 502/263; 502/326; 502/327; 502/328; 502/330; 502/332; 502/33; 502/334; 502/335; 502/336; 502/337; 502/338; 502/339; 502/341; 502/344; 502/355; 502/406; 502/415; 502/439; 502/527.24; 977/773

(58) Field of Classification Search .......... 502/240–439, 502/527.24; 422/211; 429/421; 977/773; 423/648.1, 657
See application file for complete search history.

(56) References Cited

U.S. PATENT DOCUMENTS

| | | | | |
|---|---|---|---|---|
| 6,579,824 | B1* | 6/2003 | Herzog et al. | 502/302 |
| 6,696,596 | B1* | 2/2004 | Herzog et al. | 560/245 |
| 7,476,373 | B2* | 1/2009 | Shioya et al. | 423/213.5 |
| 8,058,202 | B2* | 11/2011 | Brady et al. | 502/184 |
| 2001/0045364 | A1 | 11/2001 | Hockaday et al. | |
| 2005/0276746 | A1 | 12/2005 | Zhang et al. | |
| 2006/0293173 | A1* | 12/2006 | Zhang et al. | 502/182 |
| 2007/0172417 | A1* | 7/2007 | Zhang et al. | 423/648.1 |
| 2007/0264190 | A1 | 11/2007 | Zhang et al. | |
| 2009/0264277 | A1* | 10/2009 | Raj et al. | 502/4 |

FOREIGN PATENT DOCUMENTS

EP   1 369 947   12/2003

OTHER PUBLICATIONS

International Search Report from French Application No. 08 05914, filed Oct. 24, 2008.

* cited by examiner

*Primary Examiner* — Cam N. Nguyen
(74) *Attorney, Agent, or Firm* — Alston & Bird LLP

(57) ABSTRACT

Catalytic system comprising at least two components:
- a catalyst for the hydrolysis reaction of metal borohydrides to hydrogen; and
- a material in solid form, the dissolution reaction of which in water is exothermic.

12 Claims, 3 Drawing Sheets

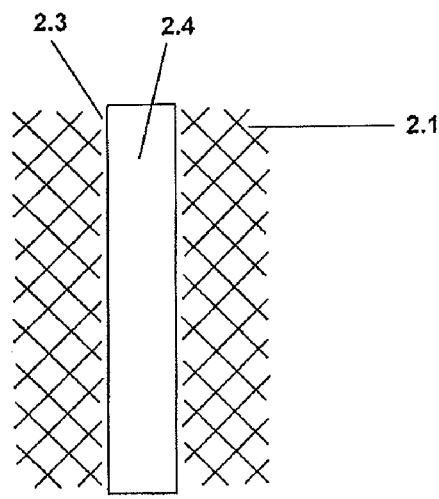
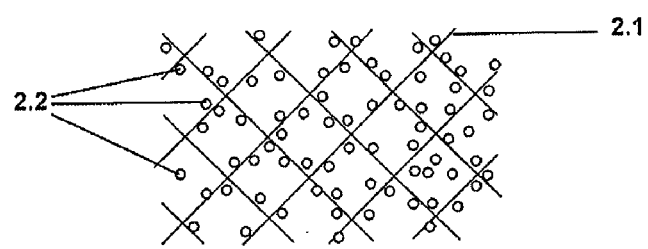
Figure 2A
Figure 2B
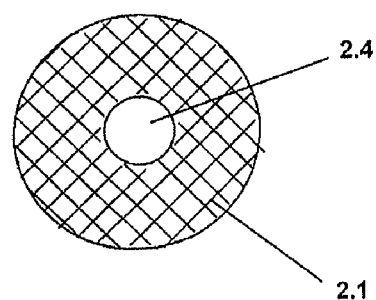
Figure 2C

CATALYTIC SYSTEM FOR GENERATING HYDROGEN BY THE HYDROLYSIS REACTION OF METAL BOROHYDRIDES

CROSS-REFERENCE TO RELATED APPLICATIONS

This application claims priority from French Application No. 0805914, filed Oct. 24, 2008, which is hereby incorporated herein in its entirety by reference.

FIELD AND BACKGROUND OF THE INVENTION

One subject of the invention is novel catalytic systems for the production of hydrogen by hydrolysis of metal borohydrides and also devices for producing hydrogen that use these novel systems. More particularly, the invention relates to catalytic systems that promote the hydrolysis reaction of metal borohydrides to hydrogen.

Hydrogen is what is known as a "clean" fuel, since it reacts with oxygen in suitable devices to give electrical energy and water. It is used as fuel in certain combustion engines and in fuel cells. The use of hydrogen as a fuel is therefore advantageous from the environmental point of view. It is consequently desirable to provide methods of producing hydrogen which are satisfactory and which can be carried out in devices of reduced size or miniaturized devices so as to be able to integrate this production of hydrogen into microsystems.

The storage and production of hydrogen in situ constitute the main hindrance to the emergence of fuel cells. One of the most promising systems for storing and producing hydrogen uses compounds of metal borohydride type as a means for storing hydrogen. Sodium borohydride in particular is particularly promising since it can be easily dissolved in an aqueous medium.

Metal catalysts are known, especially from document U.S. Pat. No. 6,534,033, which make it possible to activate the reduction of metal hydrides, and in particular of metal borohydrides, to hydrogen, this reaction taking place in the presence of water, according to the scheme below:

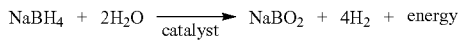

$$NaBH_4 + 2H_2O \xrightarrow{catalyst} NaBO_2 + 4H_2 + energy$$

This reaction is exothermic. The borate produced is non-toxic and can be regenerated to borohydride.

Besides sodium borohydride ($NaBH_4$), other metal hydrides may be used to carry out this reaction.

The catalysts that can be used for carrying out this reaction and which are taught by U.S. Pat. No. 6,534,033 include, in particular, metals ranging from Group IB to Group VIIIB of the Periodic Table of the Elements, or compounds obtained from these metals. Mention may especially be made of ruthenium, copper, cobalt, iron, nickel, manganese, rhodium, rhenium, platinum, palladium, chromium, silver, osmium and iridium.

Various devices that make it possible to carry out this reaction have been proposed. Generally, a hydrogen generator functions according to the principle represented schematically in FIG. 1.

An aqueous solution of sodium borohydride (1.1) is injected from a reservoir (1) into a catalytic reactor (2) using a pump (3). The borohydride is hydrolysed in contact with the catalysts present in the reactor. The reaction products are conveyed to a separation chamber (4) in which the hydrogen is separated from the borate formed. This borate is then recovered in a reservoir (5) in order to be possibly recycled, whereas the hydrogen is conveyed to the fuel cell (6). The hydrogen demand is managed by controlling the flow rate of the aqueous metal borohydride solution.

The main drawback of this technology lies in the need to preheat the aqueous metal borohydride solution. This is because the kinetics of this reaction, in accordance with the Arrhenius law, are a function of the temperature. In order to promote a high reaction rate, it is therefore necessary to activate the system via a heat input, especially when the generator is used at low temperature.

Moreover, one limiting factor of the reaction is the solubility of the initial borohydrides. The solubility of sodium borohydride in water is only 35%, that of the reaction product, $NaBO_2$, is only 22% at room temperature. It is therefore necessary to make provision either for using a very dilute solution of sodium borohydride (to avoid the precipitation of the product of the reaction), or for supplying water to the reaction as it progresses. But to maximize the energy density of the system it is sought to work with sodium borohydride concentrations that are as high as possible. The fact of heating the metal borohydride solution makes it possible to increase the solubility of the latter and above all that of the product of the reaction, and to work with more concentrated solutions.

One solution to this problem is proposed in the US 2005/0276746 patent application: the hydrogen generator comprises a system for heating the aqueous solution. The element that provides the heating may be external, it is then a heat source added to the conventional devices. But this solution has the drawback of adding to the space requirements of the device while it is sought to have hydrogen generators that are as compact as possible. Another solution consists in recovering the heat produced by the hydrolysis reaction of the metal borohydride in order to preheat the solution. In the latter case, the heating is not available at the start-up of the device.

Therefore, there remains the need for means that make it possible to carry out the conversion reaction of metal borohydrides to hydrogen at high reactant concentrations, in order to have high hydrogen yields with high reaction kinetics from the start-up of the device. And it was desired that this reaction can be carried out in simple reactors that are not very bulky, so as to favour the yield of hydrogen relative to the bulkiness of the device.

The solution to this problem lies in the development of novel catalytic systems which will be described below.

SUMMARY OF THE INVENTION

A first subject of the invention consists of a catalytic system comprising at least two components:
 the first component is a catalyst for the hydrolysis reaction of metal borohydrides to hydrogen; and
 the second component is a material of which the dissolution reaction in water is exothermic and which is inert with respect to the reactants and to the products of the hydrolysis reaction of the metal borohydrides to hydrogen.

This catalytic system is a combination of at least two components, but other components chosen from these two categories or other categories, not included in these two families of components, may be used in this catalytic system. This combination may take various forms which will be described in detail below.

The first component of the catalytic system of the invention is composed of metal particles having the property of catalysing the hydrolysis reaction of metal borohydrides to hydrogen. These metal particles are composed of one or more compounds chosen from the atoms from Group IIIA to Group VIIIB of the Periodic Table of the Elements.

The atoms from Group IIIA to Group VIIIB of the Periodic Table of the Elements form a group composed of the following atoms: ruthenium, copper, cobalt, iron, nickel, manganese, rhodium, rhenium, platinum, palladium, chromium, silver, gold, osmium, iridium, scandium, titanium and vanadium.

Preferably, one or more atoms from the following group: Pt, Ru, Pd, Co, Cr, Ni, Fe is chosen for the catalyst.

The metal particles are advantageously metal nanoparticles, that is to say particles having a size between 1 and 500 nm, and preferably between 5 and 100 nm. This is because small-size metal particles are more effective as catalysts.

Preferably, the metal nanoparticles used in the invention are supported by a substrate having a porous structure: provision may especially be made for the metal particles to be supported by an open-cell foam or by a mesh. Such a structure may be of metallic nature, be composed of polymers or of carbon. Such materials are sold by the companies Goodfellow, Porvair, Recemat, Inco, especially in the form of sheets composed of Ni foam having a thickness between 1 and 2 mm, having a density ranging from 0.4 to 0.6 g/cm$^3$, having a porosity greater than 80%, with pore sizes ranging from 200 to 400 μm. The advantage of a porous structure as a support for the catalyst is that it offers a maximum exchange area between the metal particles and the liquid flow while avoiding pressure drops along the catalyst bed.

The second component of the catalytic system of the invention is a material for which the dissolution reaction in water is exothermic and which is inert with respect to the reactants and products of the hydrolysis reaction of metal borohydrides to hydrogen. This material may be organic or mineral. It is advantageously in solid form, which makes the preparation of the catalytic system of the invention easier. This compound, when it is brought into contact with water, dissolves producing heat, known as heat of solution and measured in kJ/mol. Advantageously, a compound having a heat of solution greater than or equal, in absolute value, to 20 kJ/mol is chosen.

Table 1 below illustrates some compounds which are usable in the invention for their heat of solution:

TABLE 1

| Compound | Heat of solution in kJ/mol |
|---|---|
| NaOH | −44.5 |
| KOH | −57.6 |
| LiOH | −23.6 |
| CaCO$_3$ | −23.4 |
| CaCl$_2$ | −82.9 |
| LiCl | −37 |
| CsOH | −71.6 |
| MgCl$_2$ | −152 |
| MnCl$_2$ | −67 |

It is possible to use a mixture of materials for their heat of dissolution. These must be inert with respect to the reactants and products of the hydrolysis reaction of metal borohydrides to hydrogen. That is to say that they must not react with these reactants and these products.

The second component of the catalytic system of the invention is combined, in solid form, with the first component (the catalyst material). Advantageously, the second component of the catalytic system is in the form of a block which is placed in contact with the substrate having a porous structure. But provision may also be made for it to be in powder form and dispersed in the substrate having a porous structure. This second component does not participate directly in the catalysis, but, during the start-up of the device, when the metal borohydride solution is introduced into the catalysis chamber, the second component of the catalytic system is dissolved by the water of the metal borohydride solution and this dissolution produces a release of heat which favours the initiation and increases the kinetics of the catalysis reaction and which promotes the solubility of the metal borohydride in water. Given that the hydrolysis reaction consumes two molecules of water per molecule of metal borohydride, the temperature rise compensates for the increase of the metal borohydride concentration and makes it possible to maintain the equilibrium of the reaction system, even working at maximum metal borohydride concentrations.

The materials of the invention may be prepared in various ways as a function of the characteristics specific to each of the raw materials.

If the catalyst comprises a support in the form of a foam or a mesh, this may be cut so as to have the shape desired for its introduction into the catalysis chamber. And provision may then be made to cut one or more orifices in the catalyst support so as to introduce thereinto blocks of the second component with exothermic dissolution.

For example, represented in FIG. 2 is a catalytic system according to the invention. This system is composed of a metal foam (2.1) having the shape of a hollow cylinder. Metal nanoparticles (2.2) have been grafted onto the walls of the foam. Placed in the central hollow portion (2.3) of this cylinder is a piece (2.4), which is itself also cylindrical, of the material with exothermic dissolution. FIG. 2A is a longitudinal section of the cylinder, FIG. 2B an enlargement of the foam (2.1) and FIG. 2C a top view of the cylinder.

But other configurations are possible: it is possible to reverse the configuration relative to that from FIG. 2A, including a catalyst cylinder supported on a polymer foam in the central cavity of a cylinder of material with exothermic dissolution. And provision may also be made to superpose a sheet of supported catalyst and a sheet of material with exothermic dissolution.

The compound with exothermic dissolution may be put into the desired form, for example of a pellet, by simple compression of the powder or by mixing with an appropriate polymer. This polymer, which is soluble or insoluble in the metal borohydride solution, makes it possible, on the one hand, to shape the compound and, on the other hand, to maintain its shape during the operation of the system, by controlling its dissolution, so as to avoid its disintegration. It is chosen as a function of the compounds with exothermic dissolution with which it is combined and it must be inert with respect to the reactants and the products of the reaction. Among the polymers that can be used, mention may be made of PVA and PVDF.

The materials of the invention have advantages with respect to the catalysts of the prior art.

This material thus makes it possible to catalyse hydrolysis reactions of metal borohydrides to hydrogen with high concentrations of metal borohydrides and with advantageous kinetics from the start-up of the system. This results in an increase in the specific energy density of the fuel.

Another subject of the invention is the use of a material as described above for catalysing the hydrolysis reaction of a metal borohydride to hydrogen according to the scheme below which illustrates the reaction with NaBH$_4$ as precursor:

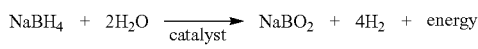

Besides sodium borohydride ($NaBH_4$), other metal borohydrides may be used to carry out this reaction, such as, for example, zinc borohydride ($Zn(BH_4)_2$), potassium borohydride ($KBH_4$), calcium borohydride ($Ca(BH_4)_2$), titanium borohydride ($Ti(BH_4)_3$), magnesium borohydride ($Mg(BH_4)_2$), sodium trimethoxyborohydride ($NaBH(OCH_3)_3$). And although it does not act as a metal borohydride, it is possible to include aminoborane ($NH_3B_3$) in the list of hydrides that can be used as a reactant in the above reaction.

The aqueous solution contains from 1 to 60% by weight of borohydride and preferably from 20 to 40% by weight.

It also contains a base of MOH type, with M=Na or K, in order to limit the spontaneous decomposition of the solution. The base has a concentration of 1 to 15% by weight.

Another subject of the invention is a catalysis chamber enabling the implementation of a hydrolysis reaction of a metal borohydride to hydrogen, this catalysis chamber comprising a catalytic system as described above and being adapted to enable the use thereof: it must permit a flow of reactants entering and exiting the chamber while retaining the catalytic system of the invention in the reaction chamber.

And provision may be made for the catalysis chamber to comprise means that make it possible to recover the heat of the hydrolysis reaction and to transfer it to the metal borohydride reservoir, so that once the hydrolysis reaction is initiated, since this reaction is exothermic, it is self-supplied with energy.

Another subject of the invention is a fuel cell comprising a catalytic system as described above for catalysing the hydrogen production reaction. And in particular a fuel cell comprising a catalysis chamber as described above.

BRIEF DESCRIPTION OF THE DRAWINGS

Some of the features and advantages of the invention having been described, others will become apparent from the example which follows and from the accompanying drawings, in which:

FIGS. 2A to 2C illustrate a catalytic system according to the invention; and

EXAMPLE

Use is made of a nickel foam sold by Goodfellow having a density of 0.5 g/cm³. This foam is cut in order to obtain hollow cylinders having a thickness of 1.6 mm and an outer diameter of 10 mm and an inner diameter of 4 mm. These rings are then cleaned with a solution of ethanol in an ultrasound bath then activated with a 0.1 mol/L hydrochloric acid solution. Each of the foams is then submerged in 10 mL of 0.1 mol/L cobalt chloride solution. A solution of $NaBH_4$ (20 mL) having a concentration of 5% is then added to the solution containing the rings. The reaction of reduction of the cobalt salt takes place and gives rise to the formation and the deposition of 35 mg of cobalt nanoparticles on the nickel foam.

Simultaneously, a cylinder having a diameter of 4 mm and a length of 10 mm is prepared by pressing a mixture of potassium hydroxide and 20% by weight of polyacrylic acid under a pressure of 5 tons/cm² for 3 min at room temperature.

Five rings are then assembled on the potassium hydroxide cylinder by "press fitting".

The catalytic system thus formed corresponds to that illustrated in FIG. 2. It is characterized by virtue of an experimental assembly that enables a solution of $NaBH_4$ having a weight concentration of 10% (stabilized with 3% by weight of NaOH) in water to pass through. This assembly makes it possible to evaluate the capacity of the system with respect to the start-up conditions of the reaction.

Figure 1:
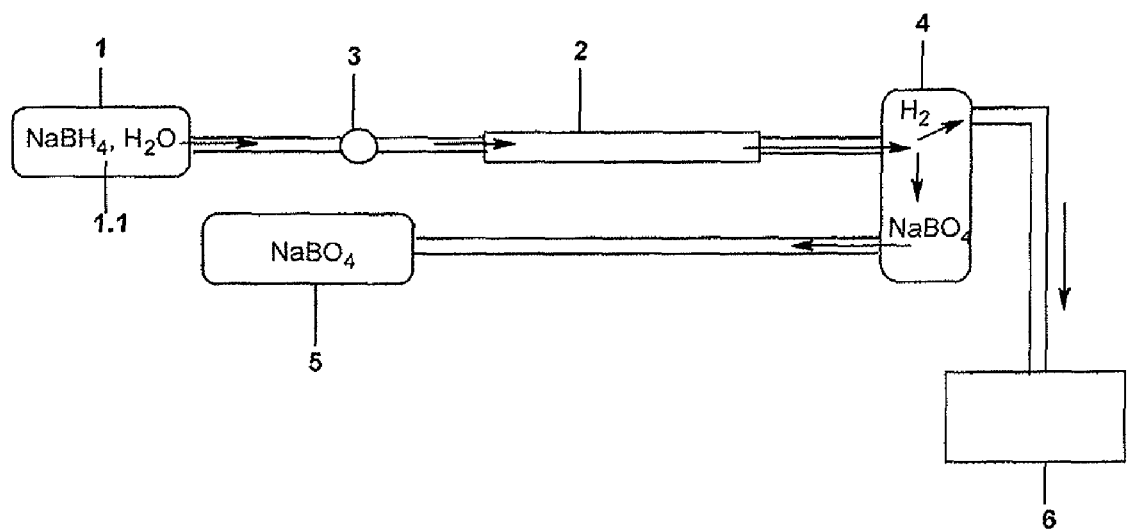
FIG. 1 is a schematic illustration of a hydrogen generator.
Figure 3:
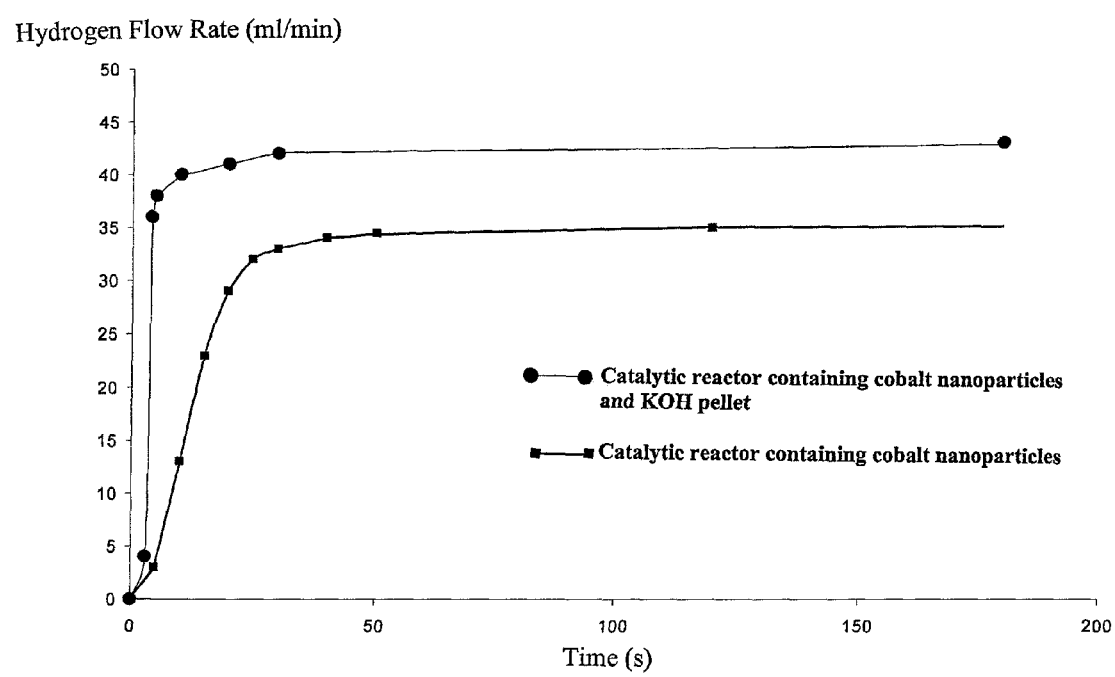
FIG. 3 is a graph illustrating the experimental results obtained with the catalytic system of the present invention and those obtained with a conventional reactor at a temperature of 10° C.

Reported in FIG. 3 are the experimental results obtained with the catalytic system of the present invention and those obtained with a conventional reactor at a temperature of 10° C.

As may be observed in this figure, during the start-up of the reaction, that is to say when the solution arrives, the catalytic reactor with the compound with exothermic dissolution has a better efficiency than the conventional reactor. This phenomenon is all the more significant since the temperature is low.

The invention claimed is:

1. A catalytic system comprising at least two components wherein:
    the first component is a catalyst for the hydrolysis reaction of metal borohydrides to hydrogen, constituted of metal particles supported by a substrate having a porous structure; and
    the second component is a material in solid form, the dissolution reaction of which in water is exothermic and which is inert with respect to the reactants and to the products of the hydrolysis reaction of the metal borohydrides to hydrogen, said second component being selected from the group consisting of NaOH, KOH, LiOH, $CaCO_3$, $CaCl_2$, LiCl, CsOH, $MgCl_2$ and $MnCl_2$, and said second component being in the form of a block which is placed in contact with the substrate having a porous structure, or in powder form and dispersed in the substrate having a porous structure.

2. A catalytic system according to claim 1, wherein the first component is composed of metal particles composed of one or more compounds chosen from the atoms from Group IIIA to Group VIIIB of the Periodic Table of the Elements.

3. A catalytic system according to claim 2, wherein the atoms from Group IIIA to Group VIIIB are chosen from the following group: Pt, Ru, Pd, Co, Cr, Ni and Fe.

4. A catalytic system according to claim 2, wherein the metal particles have a size between 1 and 500 nm, and preferably between 5 and 100 nm.

5. A catalytic system according to claim 1, wherein the substrate with the porous structure is chosen from open-cell foams and meshes.

6. A catalytic system according to claim 1, wherein the second component is a compound having a heat of solution greater than or equal, in absolute value, to 20 kJ/mol.

7. A catalytic system according to claim 1, comprising a cylindrical piece of the material for which the dissolution reaction in water is exothermic, surrounded by a metal foam having metal nanoparticles grafted onto the walls of the metal foam.

8. A method for catalyzing the hydrolysis reaction of metal borohydride to hydrogen, said method comprising using a catalytic system according to claim 1.

9. A method according to claim 8, comprising catalyzing the hydrolysis reaction of $NaBH_4$ to hydrogen according to the scheme below:

$$NaBH_4 + 2H_2O \xrightarrow{catalyst} NaBO_2 + 4H_2 + energy.$$

10. A catalysis chamber enabling the implementation of a hydrolysis reaction of a metal borohydride to hydrogen, this catalysis chamber comprising a catalytic system according to claim 1.

11. A fuel cell comprising a catalytic system according to claim 1.

12. A catalytic system according to claim 1, wherein the substrate comprises one or more of a metal, polymer, or a carbonaceous material.

* * * * *